United States Patent Office 3,439,424
Patented Apr. 22, 1969

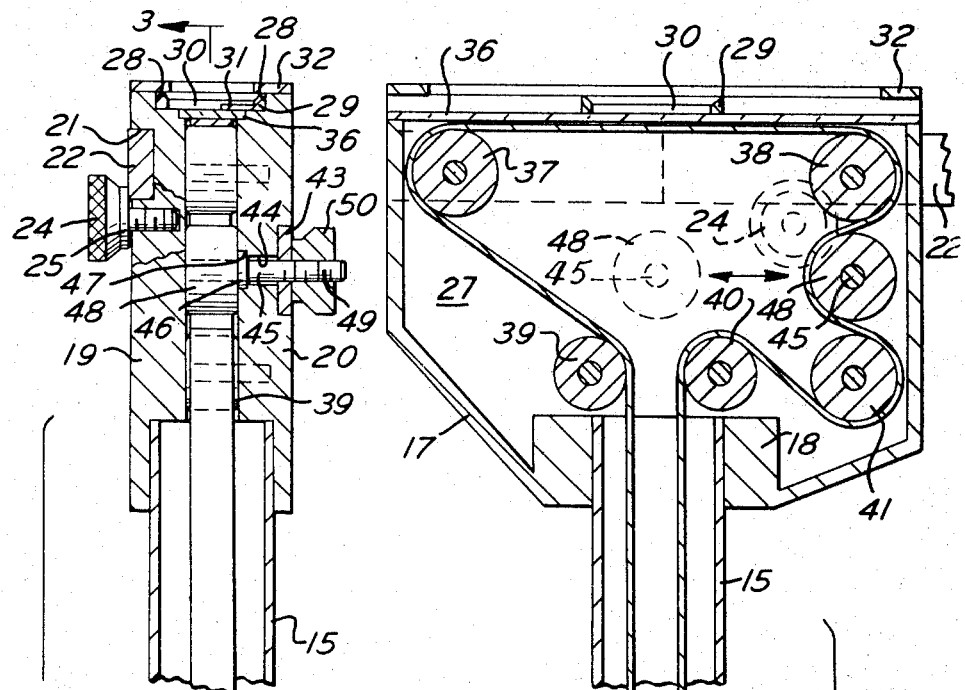
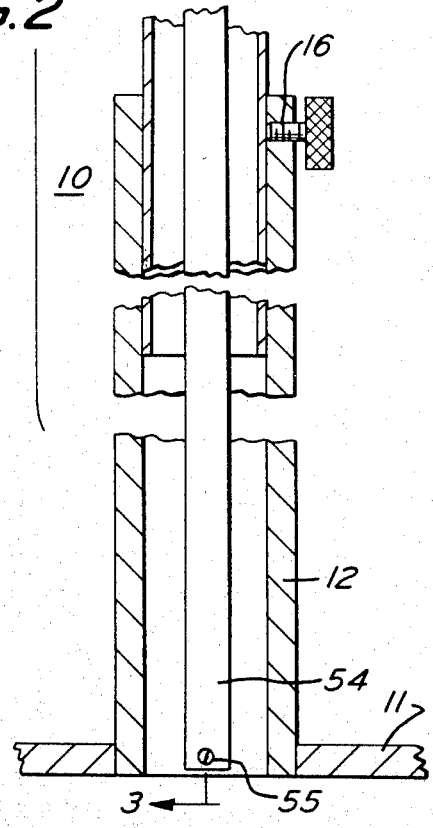
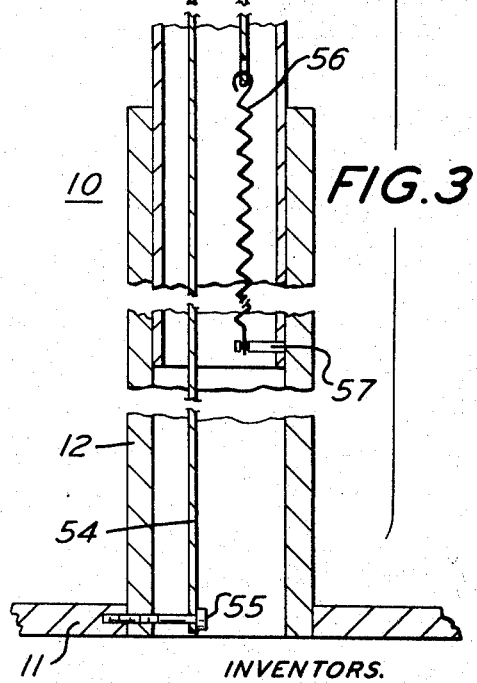
FIG.2
FIG.3
INVENTORS.
IRVING L.W. GLONINGER
LAWRENCE P.W. BELMONT, SR.

3,439,424
MEASURING APPARATUS
Irving L. W. Gloninger, Bala Cynwyd, and Lawrence P. W. Belmont, Sr., Philadelphia, Pa. (both c/o Irving L. Wilson Company, 1 Highland Ave., Bala Cynwyd, Pa. 19004)
Filed June 12, 1967, Ser. No. 645,382
Int. Cl. A41h 1/04
U.S. Cl. 33—8                                           5 Claims

ABSTRACT OF THE DISCLOSURE

Measuring apparatus for determining, by locating a gage arm at the upper margin of the trousers, the inseam dimension of the trousers, with provisions for compensation for the distance of the lower margin or bottom of the cuff from the floor and for the rise of the trousers, a direct reading of the proper inseam dimension being available.

BACKGROUND OF THE INVENTION

Field of the invention

This invention relates to measuring apparatus and more particularly to apparatus for use in connection with the determination and direct reading of the inseam measurement of trousers.

Description of the prior art

It is the common practice in connection with the sale of ready made trousers, whether sold separately or as part of a suit, to measure the desired length of inseam downwardly from the crotch so that the lower edge of the trouser legs may then be located to suit the purchaser. This location may be such that the trousers "break" slightly on the shoe, touch the shoe, or expose a portion of the sock. The taking of such measurements requires stooping on the part of the person taking the measurement and is not usually relished by the purchaser.

Such measurements are useful, not only in connection with the fitting of ready made clothes but are also useful in connection with the issuance of uniforms from stock sizes.

Trousers of the ready made type have different predetermined distances from the crotch to the upper margin of the trousers, dependent upon whether they are "short" "regular" "long" or "extra long." This distance is usually referred to as "rise."

In our prior application for Letters Patent for Measuring Apparatus filed Nov. 15, 1966, Ser. No. 594,509, an improved device for obtaining inseam measurements is shown but the reading is available only on the side and at a location which is somewhat inconvenient.

No other wholly satisfactory apparatus for making the measurements referred to has received acceptance in the clothing field.

SUMMARY

It is the principal object of the present invention to provide measuring apparatus which is particularly suited for determining the desired length of inseam of trousers, in which the measurement is made at a different location from the inseam, and in which the measurement may be readily observed by the person making the measurement.

It is a further object of the present invention to provide measuring apparatus of the character aforesaid in which measuring apparatus of the character aforesaid in which an adjustment may be quickly and easily made to accommodate the inseam length in accordance with the desired location of the lower margin of the trouser leg with respect to the floor.

It is a further object of the present invention to provide measuring apparatus of the character aforesaid in which an adjustment may be quickly and easily made to accommodate standard types of ready made trousers having predetermined distances from the crotch to the upper margin of the trousers.

It is a further object of the present invention to provide measuring apparatus of the character aforesaid which is easy to use and which greatly facilitates the determination and reading of the desired inseam length.

Other objects and advantageous features of the invention will be apparent from the description and claims.

BRIEF DESCRIPTION OF THE DRAWING

The nature and characteristic features of the invention will be more readily understood from the following description, taken in connection with the accompanying drawings forming part thereof, in which:

FIG. 2 is a vertical central sectional view, enlarged, taken approximately on the line 2—2 of FIG. 1; and FIG. 3 is a fragmentary sectional view, taken approximately on the line 3—3 of FIG. 2.

Figure 1:
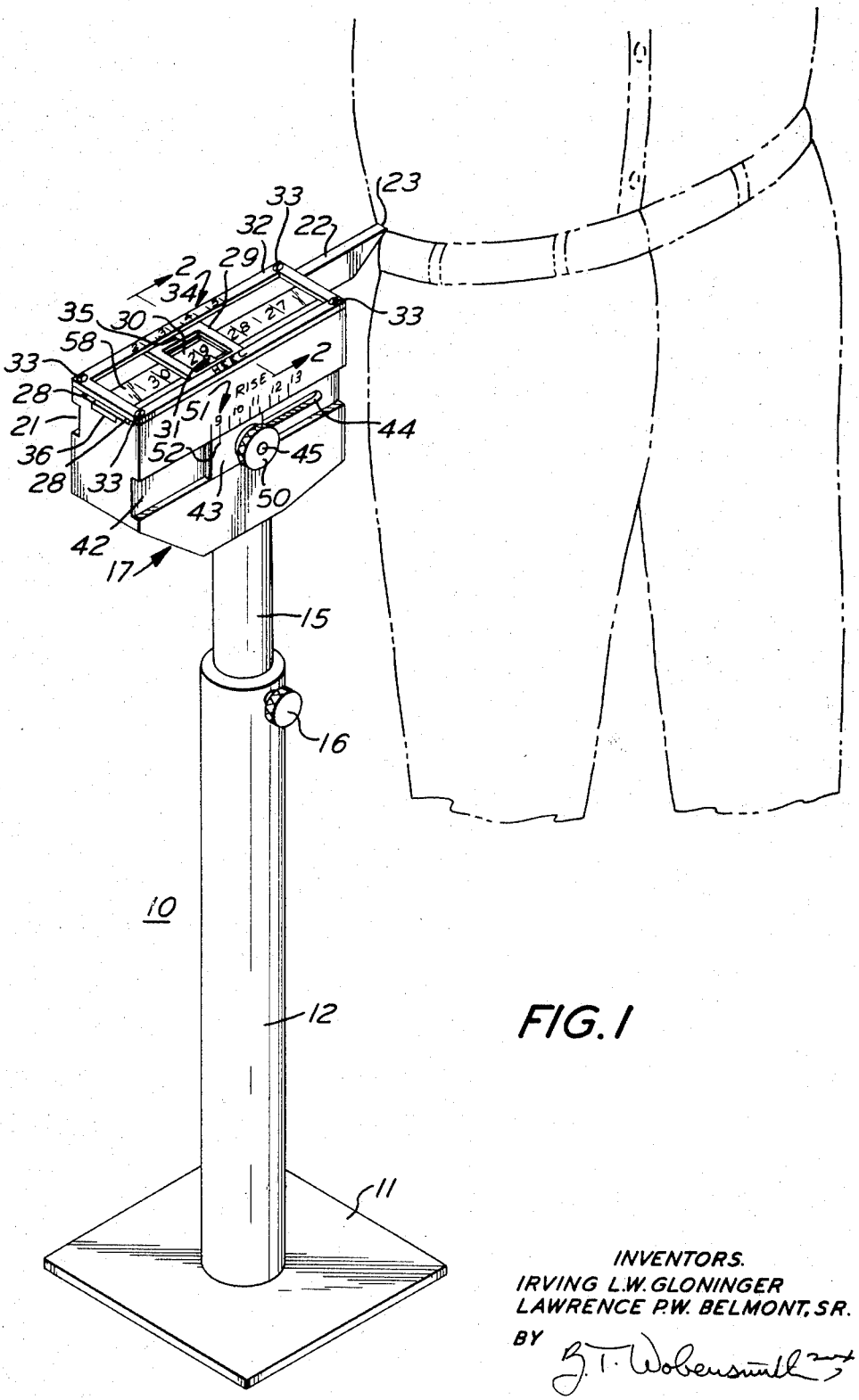
FIGURE 1 is a view in perspective illustrating the measuring apparatus of the present invention and the manner of using the same.

It should, of course, be understood that the description and drawings herein are illustrative merely, and that various modifications and changes can be made in the structure disclosed without departing from the spirit of the invention.

DESCRIPTION OF THE PREFERRED EMBODIMENTS

The apparatus in accordance with the invention preferably includes a stand with an upright tube. The stand has a tube in telescoped relation to the tube with a head having a retractable pointer or gage arm. The head also has a window for direct dimension reading, and provisions for adjustment in accordance with the desired location of the bottom edge of the trousers from the floor and in accordance with the "rise" of the particular trousers for which the inseam measurement is to be made.

Referring now more particularly to the drawings, in which a preferred embodiment of the invention is illustrated, a stand 10 is provided which has a base 11 and a tubular upright 12. The base 11 may, if desired, be weighted for added stability but this, of course, reduces the ease of portability.

A hollow tubular post 15 is provided in telescoped relation to the upright 12, and preferably in frictional engagement therein. A manually adjustable thumb screw 16 carried by the upright 12 and engaging the post 15, may be provided for retaining the post 15 at any desired elevation.

The post 15 has a head 17 with a collar 18 secured to the post 15. The head 17 has opposite side walls 19 and 20. The side wall 19 has a groove or slot 21 within which a gage arm 22 is horizontally slidably mounted. The gage arm 22 has a pointer end 23. The gage arm 22 may be retracted to a position where the pointer end 23 is shielded within the groove 21 for storage or may be moved outwardly to a position for use. A manually actuatable thumb screw 24 in engagement in the side wall 19 and having a shoulder 25 engaging the gage arm 22 can be employed to retain the gage arm 22 at either position.

The head 17 has an interior space 27 and in opposed recesses 28 in the top of the walls 19 and 20 a movable frame 29 is mounted for horizontal movement. The frame 29 has a central viewing opening 30 with an index pointer 31 extending inwardly from one side edge.

The frame 29 is retained by an open retainer frame 32 which is secured in place by bolts 33 which engage in the side walls 19 and 20. The retainer frame 32 along one edge thereof has indicia 34 corresponding to the range of spacing of the lower edge of the trousers in inches and fractions of inches from the floor and an indexing line 35 on the frame 29 is provided for selective alignment with the desired dimension of the indicia 34.

A transparent plate 36 may be provided closing the top of the interior space 27.

Within the interior space 27 upper guide rolls 37 and 38 and lower guide rolls 39 and 40 are provided journaled in the walls 19 and 20. A lower guide roll 41, below the guide roll 40, is also provided journaled in the walls 19 and 20.

The side wall 20 has a horizontal slot 42 along the exterior thereof for a slide plate 43, with a central slot 44 through which a shaft 45 extends. The shaft 45 has an enlargement 46, slidable in an interior slot 47 in the wall 20 and has a positioning roller 48 on its inner end. The shaft 45 has an outer threaded end 49 for a thumb nut 50 which by engagement with the slide plate 43 draws the enlargement 46 into holding engagement in the slot 47.

The outer face of the side wall 20, above the slot 42 has numerical indicia 51, in inches, corresponding to the "rise" or distance from the crotch to the top of the trousers for a particular garment. The slide plate 43 has an indexing line 52 to be positioned to correspond to the appropriate "rise" indicia 51.

A metallic dimension tape 54 is anchored at one end in the tubular upright 12 by an anchor bolt 55, extends upwardly within the upright 12 and post 15 in engagement with the roller 39, then over the roller 37 and horizontally beneath the transparent plate 36 across to and over the roller 38, then around the roller 45, around the rollers 41 and 40 and down through the post 15. The free end of the tape 54 has one end of a spring 56 engaged therewith, the other end of the spring 56 being carried on a pin 57 which is secured to the post 15.

The tape 54 has dimension indicia 58 thereon disposed on the outer face so as to be visible through the transparent plate 36.

The mode of use will now be pointed out.

The gage arm 22 is moved outwardly to the position for use and locked in place by the thumb screw 24.

The person to be measured stands at a preferred location for taking the measurements. The "rise" adjustment is made by loosening the thumb nut 50 and moving the shaft 49 and plate 43 to align the indexing line 52 with the desired dimension, of the indicia 51, for the rise of the particular trousers.

The heel adjustment, i.e., the adjustment to accommodate to the desired distance of the lower edges of the trousers from the floor, is effected by moving the movable frame 29 to bring the indexing line 35 to the desired dimension of the indicia 34 to suit the wearer.

The head 17 is raised or lowered, as required, to bring the pointer end 23 to the upper edge of the trousers as shown in FIG. 1.

The inseam dimension can then be read directly from the dimension on the tape 54 at the pointer 31.

The thumb screw 16 can be tightened if desired to hold the head 17 at the adjusted position for reading the inseam dimension but this is not usually necessary.

It will thus be seen that simple but effective apparatus is provided for giving a direct reading of the proper inseam measurement without the necessity for access to the crotch of the person to be measured.

This measurement can be utilized for sewing the cuffs or bottoms of the trousers at the desired location and can also be used for selecting trousers of fixed and predetermined inseam length, such as military and other uniforms, where selection can be made from stock on hand.

We claim:

1. Measuring apparatus for determining the inseam measurement of trousers comprising
    a stand having an upright portion,
    a post in telescoped relation to said upright portion,
    a head on said post having a gage arm with a free end for location at the support location of the trousers on the body,
    measurement indicating means carried by said head and controlled by the relative positioning of said head with respect to said stand,
    said means including a tape connected respectively to said stand and said post and having indicia for display at said head,
    said head having a portion for viewing a selected part of said tape, and
    adjusting means carried by said head and in engagement with said tape for varying the position of said selected part to accommodate said measurement indicating means to different rises of trousers.

2. Measuring apparatus as defined in claim 1 in which said adjusting means includes
    a shaft,
    a roller on said shaft in engagement with said tape,
    and an adjustable mounting in said head for said shaft.

3. Measuring apparatus as defined in claim 1 having additionally
    means accommodating the viewing portion of said tape to selected distances of the lower margin of the trousers from the level of the lower part of the stand.

4. Measuring apparatus as defined in claim 3 in which
    said last means includes a frame slidably mounted on said head with a window opening for said viewing portion of said tape.

5. Measuring apparatus as defined in claim 1 in which
    said head has guide rolls thereon with which said tape is in engagement.

References Cited

UNITED STATES PATENTS

| | | | |
|---|---|---|---|
| 2,112,929 | 4/1938 | Shulman et al. | 33—8 |
| 2,501,948 | 3/1950 | Knipp | 33—8 |
| 2,734,270 | 2/1956 | Finnegan | 33—8 |

WILLIAM D. MARTIN, JR., *Primary Examiner.*

U.S. Cl. X.R.

33—169